(12) United States Patent
Yohe et al.

(10) Patent No.: US 11,661,562 B2
(45) Date of Patent: May 30, 2023

(54) HYDROCARBON FLUIDS AND USES THEREOF

(71) Applicant: ExxonMobil Chemical Patents Inc., Baytown, TX (US)

(72) Inventors: Sara L. Yohe, Houston, TX (US); Gregory D. Kitts, Katy, TX (US); Richard J. Saplis, Fort Collins, CO (US); Daniel Bien, Brussels (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 148 days.

(21) Appl. No.: 16/645,628

(22) PCT Filed: Sep. 10, 2018

(86) PCT No.: PCT/US2018/050233
§ 371 (c)(1),
(2) Date: Mar. 9, 2020

(87) PCT Pub. No.: WO2019/051391
PCT Pub. Date: Mar. 14, 2019

(65) Prior Publication Data
US 2020/0277532 A1 Sep. 3, 2020

Related U.S. Application Data

(60) Provisional application No. 62/556,571, filed on Sep. 11, 2017.

(30) Foreign Application Priority Data

Mar. 9, 2018 (EP) ..................... 18160969

(51) Int. Cl.
| | |
|---|---|
| *C09K 8/035* | (2006.01) |
| *C09J 11/06* | (2006.01) |
| *C09D 7/63* | (2018.01) |
| *C10M 169/04* | (2006.01) |
| *C09D 11/36* | (2014.01) |
| *C10M 101/02* | (2006.01) |
| *C09K 5/10* | (2006.01) |
| *C10G 5/00* | (2006.01) |
| *C10N 20/00* | (2006.01) |
| *C10N 30/00* | (2006.01) |
| *C10N 30/02* | (2006.01) |
| *C10N 30/10* | (2006.01) |
| *C10N 30/14* | (2006.01) |
| *C10N 30/16* | (2006.01) |
| *C10N 40/14* | (2006.01) |

(52) U.S. Cl.
CPC ............ *C10M 101/02* (2013.01); *C09D 7/63* (2018.01); *C09D 11/36* (2013.01); *C09J 11/06* (2013.01); *C09K 5/10* (2013.01); *C09K 8/035* (2013.01); *C10G 5/00* (2013.01); *C10M 169/04* (2013.01); *C10G 2300/1074* (2013.01); *C10G 2300/301* (2013.01); *C10G 2300/302* (2013.01); *C10G 2300/304* (2013.01); *C10G 2300/308* (2013.01); *C10G 2400/30* (2013.01); *C10M 2203/1045* (2013.01); *C10M 2203/1065* (2013.01); *C10M 2203/1085* (2013.01); *C10M 2207/023* (2013.01); *C10N 2020/015* (2020.05); *C10N 2020/017* (2020.05); *C10N 2030/02* (2013.01); *C10N 2030/10* (2013.01); *C10N 2030/14* (2013.01); *C10N 2030/16* (2013.01); *C10N 2030/28* (2020.05); *C10N 2040/14* (2013.01)

(58) Field of Classification Search
CPC . C09K 8/035; C09J 11/06; C09D 7/63; C09D 11/36; C10M 169/04; C10G 2300/301; C10G 2300/302; C10G 2300/304; C10G 2300/308
See application file for complete search history.

(56) References Cited

U.S. PATENT DOCUMENTS

| | | | | |
|---|---|---|---|---|
| 2,616,854 | A * | 11/1952 | Fenske ................. | C10M 1/08 252/79 |
| 4,228,023 | A | 10/1980 | Schulz et al. | |
| 5,055,162 | A | 10/1991 | Brown et al. | |
| 5,911,874 | A | 6/1999 | Cody et al. | |
| 6,096,189 | A | 8/2000 | Cody et al. | |
| 6,951,605 | B2 | 10/2005 | Cody et al. | |
| 8,298,451 | B2 | 10/2012 | Sinclair et al. | |
| 8,394,255 | B2 | 3/2013 | McCarthy et al. | |
| 8,617,383 | B2 | 12/2013 | Prentice et al. | |
| 8,992,764 | B2 | 3/2015 | Prentice et al. | |
| 9,309,472 | B2 | 4/2016 | Vijay et al. | |
| 9,394,494 | B2 | 7/2016 | Joseck et al. | |
| 9,587,184 | B2 | 3/2017 | Joseck et al. | |
| 11,053,448 | B2 * | 7/2021 | Rämö ................ | C10M 101/02 |
| 2006/0100466 | A1 | 5/2006 | Holmes et al. | |
| 2006/0100467 | A1 | 5/2006 | Holmes et al. | |
| 2007/0197405 | A1 * | 8/2007 | Holmes ................ | H01B 3/22 508/110 |
| 2009/0001330 | A1 | 1/2009 | Arickx et al. | |
| 2009/0036337 | A1 | 2/2009 | Deskin et al. | |
| 2012/0205589 | A1 | 8/2012 | Hansen | |

(Continued)

FOREIGN PATENT DOCUMENTS

| WO | 2007/027782 A1 | 3/2007 |
|---|---|---|
| WO | 2019/051363 | 9/2018 |

(Continued)

*Primary Examiner* — Randy Boyer
(74) *Attorney, Agent, or Firm* — ExxonMobil Technology and Engineering Company—Chemicals

(57) ABSTRACT

A hydrocarbon fluid is disclosed that has a pour point of at most −30° C., as measured by ASTM D5950, and that comprises at least 99 wt % of naphthenes and paraffins, based on the total weight of the hydrocarbon fluid, wherein the weight ratio of naphthenes to paraffins is at least 1, as measured by GC-MS, and wherein the paraffins consist essentially of isoparaffins, as determined by GC-FID. In addition, preferred uses of said hydrocarbon fluid are disclosed.

15 Claims, No Drawings

(56) References Cited

U.S. PATENT DOCUMENTS

| | | |
|---|---|---|
| 2017/0183576 A1 | 6/2017 | Hilbert et al. |
| 2017/0183577 A1 | 6/2017 | Hilbert et al. |
| 2017/0183578 A1 | 6/2017 | Hilbert et al. |
| 2017/0306253 A1* | 10/2017 | Wrigley .................. C10G 7/00 |

FOREIGN PATENT DOCUMENTS

| | | |
|---|---|---|
| WO | 2019/051363 | 3/2019 |
| WO | 2019/051391 A | 3/2019 |

* cited by examiner

HYDROCARBON FLUIDS AND USES THEREOF

CROSS-REFERENCE OF RELATED APPLICATIONS

This application is a National Phase Application claiming priority to PCT Application Serial No. PCT/US2018/050233, filed Sep. 10, 2018, which claims the benefit of U.S. Provisional Application Ser. No. 62/556,571, filed 11 Sep. 2017, and European Patent Application Serial No. 18160969.4, filed 9 Mar. 2018.

TECHNICAL FIELD

The present disclosure generally relates to hydrocarbon fluids and their uses, in particular to dearomatized hydrocarbon fluids and their use.

BACKGROUND

Hydrocarbon fluids, and in particular dearomatized hydrocarbon fluids, find widespread use as solvents and base oils such as in lubricants, agricultural chemical ("AgChem") applications, coolant and/or heat transfer fluids, electric vehicle fluids, acrylic and silicone mastics and sealants, printing inks, paints, coatings, adhesives, drilling fluids, metalworking fluids, cleaning fluids, consumer products, etc.

The chemical nature and composition of hydrocarbon fluids vary considerably according to the use to which the fluid is to be put. Important properties of hydrocarbon fluids, in addition to their composition and in particular to their aromatics content, are the distillation range, flash point, pour point (low temperature properties), aniline point (solvency), viscosity, refractive index, etc. Unlike fuels, hydrocarbon fluids have narrow boiling point ranges (narrow cut) as indicated by a narrow range between Initial Boiling Point (IBP) and Final Boiling Point (FBP).

Hydrocarbon fluids of petroleum origin are derived from the refining of refinery streams in which the fluid having the desired properties is obtained by subjecting the most appropriate feed stream to fractionation and purification.

There exists many types of hydrocarbon fluids but there still exists a need for hydrocarbon fluids and in particular for dearomatized hydrocarbon fluids having improved properties, in particular in terms of low temperature properties and solvency. The object of the embodiments disclosed herein is therefore to provide such a hydrocarbon fluid, in particular a dearomatized hydrocarbon fluid that has improved low temperature properties and solvency.

BRIEF SUMMARY

In a first aspect, the present invention relates to a hydrocarbon fluid having a pour point of at most $-30°$ C., as measured by ASTM D5950, and comprising at least 99 wt % of naphthenes and paraffins, wherein the weight ratio of naphthenes to paraffins is at least 1, as measured by GC-MS (Gas Chromatography-Mass Spectrometry), and wherein the paraffins consist essentially of isoparaffins, as determined by GC-FID (Gas Chromatography with Flame Ionization Detection).

In second aspect, the present invention relates to the use of the hydrocarbon fluid of the first aspect of the invention in any one of AgChem applications such as spray oils; coolant and/or heat transfer fluids; electric vehicle fluids; acrylic and silicone mastics and sealants; printing inks, paints, coatings, and adhesives; lubricants such as automotive lubricant, transmission fluid, hydraulic oil, spindle oil, coning oil, mould oil and diluent oil for lube additives; plasticizers; drilling fluids and drilling muds; mining extraction and metal extraction applications; explosive formulations; process fluids; dust control fluids; metalworking fluids; collector fluids in floatation process; industrial and institutional cleaners; consumer products; and animal vaccines.

In a third aspect, the present invention relates to spray oils comprising the hydrocarbon fluid of the first aspect of the present invention.

In a fourth aspect, the present invention relates to coolants, heat transfer fluids and/or electric vehicle fluids comprising the hydrocarbon fluid of the first aspect of the present invention.

In a fifth aspect, the present invention relates to acrylic and/or silicone mastics and/or sealants comprising the hydrocarbon fluid of the first aspect of the present invention.

In a sixth aspect, the present invention relates to printing inks, paints, coatings and/or adhesives comprising the hydrocarbon fluid of the first aspect of the present invention.

In a seventh aspect, the present invention relates to drilling fluids and/or drilling muds comprising the hydrocarbon fluid of the first aspect of the present invention.

In an eight aspect, the present invention relates to lubricants comprising the hydrocarbon fluid of the first aspect of the present invention.

DETAILED DESCRIPTION

As used herein, the expression "hydrocarbon fluid" refers to liquid compounds comprised of molecules consisting of hydrogen and carbon atoms. The vast majority of hydrocarbon fluids are derived from petroleum by distillation and other refining processes.

As used herein, the expression "dearomatized hydrocarbon fluid" refers to a hydrocarbon fluid comprising no more than 1 wt % of total aromatics, in particular less than 1 wt % of total aromatics, as measured by ASTM D7419.

As used herein, the expression "paraffins" refers to acyclic saturated hydrocarbons of general chemical formula $C_nH_{2n+2}$; the expression "n-paraffins" refers to normal paraffins or linear paraffins which are straight-chain acyclic saturated hydrocarbons; the expression "isoparaffins" refers to branched paraffins which are branched acyclic saturated hydrocarbons; the expression "naphthenes" refers to cycloparaffins which are cyclic non-aromatic hydrocarbons; and the expression "aromatics" refers to aromatic hydrocarbons, i.e. hydrocarbons containing at least one aromatic ring.

In a first aspect of the present invention, embodiments disclosed herein provide a hydrocarbon fluid having a pour point of at most $-30°$ C., as measured by ASTM D5950, and comprising at least 99 wt % of naphthenes and paraffins, wherein the weight ratio of naphthenes to paraffins is at least 1, and wherein the paraffins consist essentially of isoparaffins. The respective amounts of naphthenes and paraffins, based on the total weight of the hydrocarbon fluid, and therefore the weight ratio of said naphthenes to paraffins, may suitably be measured by GC-MS. As used herein, the expression "paraffins consist essentially of isoparaffins" intends to denote that no n-paraffin peaks were identified by GC-FID, i.e. no n-paraffin peaks were large enough to extend above the unresolved complex mixture as analysed by GC-FID (detection limit of 3 wt % n-paraffins, based on the total weight of the hydrocarbon fluid), so that all the paraffins present in the mixture can be considered as isoparaffins. In view of the detection limit of the GC-FID method, i.e. 3 wt % n-paraffins based on the total weight of the hydrocarbon fluid, the expression "paraffins consist essentially of isoparaffins" means that the hydrocarbon fluid of the first aspect of the present invention contains less than 3 wt % n-paraffins. The hydrocarbon fluid of at least some of the embodiments disclosed herein may thus be considered as consisting essentially of naphthenes and paraffins, especially as consisting essentially of naphthenes and isoparaffins. A low amount of n-paraffins, i.e. less than 3 wt % n-paraffins based on the total weight of the hydrocarbon fluid, is especially advantageous, for instance in terms of low temperature properties and especially pour point and in terms of solvency. N-paraffins are indeed known to have higher pour point and lower solvency than isoparaffins.

In particular, the hydrocarbon fluid of embodiments disclosed herein may comprise at least 99.5 wt % of naphthenes and paraffins, for instance at least 99.8 wt % of naphthenes and paraffins, and/or the weight ratio of naphthenes to paraffins may be greater than 1, more preferably from greater than 1.0 to 4.0, especially from greater than 1.0 to 3.0, in particular from greater than 1.0 to 2.3, such as from greater than 1.0 to 1.5 or from 1.2 to 2.3 or from 1.5 to 2.3, as measured by GC-MS.

In a preferred embodiment of the present invention, the hydrocarbon fluid may comprise from 50 to 90 wt % naphthenes and from 10 to 50 wt % paraffins, such as from 50 to 80 wt %, especially from more than 50 wt % to 70 wt %, such as from more than 50 wt % to 60 wt % or from 55 to 70 wt % or from 60 to 70 wt % naphthenes and from 20 to 50 wt %, especially from 30 to 50 wt %, such as from 40 to 50 wt % or from 30 to 45 wt % or from 30 to 40 wt % paraffins, based on the total weight of the hydrocarbon fluid, as measured by GC-MS, in particular with a weight ratio of naphthenes to paraffins from greater than 1.0 to 4.0, especially from greater than 1.0 to 3.0, in particular from greater than 1.0 to 2.3, such as from greater than 1.0 to 1.5 or from 1.2 to 2.3 or from 1.5 to 2.3.

In a further preferred embodiment of the present invention, the hydrocarbon fluid comprises no more than 1 wt % of total aromatics, in particular less than 1 wt % of total aromatics, preferably no more than 0.6 wt % of total aromatics, and more preferably no more than 0.3 wt % or even no more than 0.2 wt % of total aromatics, based on the total weight of the hydrocarbon fluid, as measured by ASTM D7419. A low aromatic content may be required in view of environmental and/or safety considerations and/or may be required in certain applications such as in silicone oil extenders wherein aromatics lead to yellowing, in drilling fluids for which the specifications are often less than 0.5 wt % total aromatics and less than 10 wppm polycyclic aromatic hydrocarbon (PAH) content, spray oils having an unsulfonated residue higher than 92% which can only be achieved with low aromatic content, rolling oils which require a low aromatic content to increase the oxidative stability and reduce the toxicity in case of food contact with the metal, as well as, more generally, all applications wherein a lower aromatic content results in a lower toxicity for man and the environment, e.g. in printing inks, paints, mold oils, etc.

In another preferred embodiment of the present invention, the hydrocarbon fluid has a naphthenic carbon content (% $C_N$) of from 20 to 50%, a paraffinic carbon content (% $C_P$) of from 50 to 80%, and an aromatic carbon content (% $C_A$) of less than 1%, based on the total weight of the hydrocarbon fluid, as measured by ASTM D2140; in particular a % $C_N$ of from 25 to 40% such as from 30 to 40%, a % $C_P$ of from 60 to 75% such as from 60 to 70%, and a % $C_A$ of no more than 0.5%, such as of no more than 0.4% or no more than 0.3% or no more than 0.2%.

In an especially preferred embodiment of the present invention, the hydrocarbon fluid comprises from 50 to 90 wt % naphthenes and from 10 to 50 wt % paraffins, based on the total weight of the hydrocarbon fluid, as measured by GC-MS, in particular with a weight ratio of naphthenes to paraffins from greater than 1.0 to 4.0, especially from greater than 1.0 to 3.0, in particular from greater than 1.0 to 2.3, such as from greater than 1.0 to 1.5 or from 1.2 to 2.3 or from 1.5 to 2.3; an undetectable level of n-paraffins as determined by GC-FID; and no more than 0.3 wt %, especially no more than 0.2 wt %, of total aromatics, based on the total weight of the hydrocarbon fluid, as measured by ASTM D7419; and has a % $C_N$ of from 20 to 50%, a % $C_P$ of from 50 to 80%, and a % $C_A$ of no more than 0.5%, based on the total weight of the hydrocarbon fluid, as measured by ASTM D2140; for example from 50 to 80 wt % or from 50 to 70 wt % such as from more than 50 wt % to 60 wt % or from 55 to 70 wt % or from 60 to 70 wt % naphthenes and from 20 to 50 wt % or from 30 to 50 wt % such as 40 to 50 wt % or from 30 to 45 wt % or from 30 to 40 wt % paraffins, based on the total weight of the hydrocarbon fluid, as measured by GC-MS, an undetectable level of n-paraffins as determined by GC-FID, and no more than 0.6 wt %, preferably no more than 0.3 wt %, especially no more than 0.2 wt % aromatics, based on the total weight of the hydrocarbon fluid, as measured by ASTM D7419, and a % $C_N$ of from 25 to 40% such as from 30 to 40%, a % $C_P$ of from 60 to 75% such as from 60 to 70%, and a % $C_A$ of no more than 0.4%, such as no more than 0.3% or no more than 0.2%, based on the total weight of the hydrocarbon fluid, as measured by ASTM D2140.

In a further preferred embodiment of the present invention, the hydrocarbon fluid has a carbon number distribution of $C_{11}$ to $C_{28}$, as determined by GC-FID.

The hydrocarbon fluid of the present invention has a pour point of at most −30° C., especially at most −35° C., or even at most −40° C. or −50° C., as measured by ASTM D5950. A low pour point is especially advantageous in many hydrocarbon fluid applications such as in silicone extenders for mastics applied outdoors, in drilling fluids, in guar slurries for hydraulic fracturing fluids and in hydraulic fluids. To achieve a low pour point of less than −30° C., historically, special naphthenic feeds requiring crude oil which is only available from certain locations like Venezuela have been used. For other oil types like esters or some paraffinic oils, it is most often necessary to use pour point depressant additives.

The hydrocarbon fluid of the first aspect of the present invention preferably has a refractive index (RI) of from 1.450 to 1.470, particularly of from 1.455 to 1.465, more particularly of from 1.457 to 1.463, for instance 1.458, 1.459, 1.460, 1.461 or 1.462, as determined by ASTM D1218 at 25° C. Without being bound by any theory, it is believed that the refractive index of the hydrocarbon fluid is representative of its specific composition.

The hydrocarbon fluid of at least some embodiments disclosed herein usually has an initial boiling point (IBP) of at least 250° C., such as at least 270° C. or at least 280° C. and a final boiling point (FBP) of at most 410° C., such as at most 390° C. or at most 380° C., as measured by ASTM D86. The distillation range as defined by (FBP-IBP) is advantageously at most 100° C., for example from 20 to 90° C., as measured by ASTM D86. The distillation range as defined by ($T_{90}-T_{10}$) is advantageously of at most 60° C., for instance from 5 or 10 to 50° C., as measured by ASTM D86. In an alternative, the hydrocarbon fluid of at least some embodiments disclosed herein may have an initial boiling point (IBP) of at least 190° C., such as at least 200° C. or at least 210° C. and a final boiling point (FBP) of at most 450° C., such as at most 440° C. or at most 430° C., as measured by ASTM D2887. The distillation range as defined by (FBP-IBP) is advantageously at most 250° C., for example from 40 to 220° C. as measured by ASTM D2887. The distillation range as defined by ($T_{90}-T_{10}$) is advantageously of at most 150° C., for instance from 20 or 30 to 100° C. as measured by ASTM D2887. In the context of the embodiments disclosed herein, $T_{[x]}$ boiling points can be understood to represent the temperature at which "x" percent of the basestock has been recovered by volume. The use of the narrow cuts brings important fluid properties such as a better defined viscosity, improved viscosity stability, defined evaporation conditions for systems where drying is important, better defined surface tension, aniline point or solvency power, and better defined flash point which is important for safety reasons.

The hydrocarbon fluid of at least some embodiments has a flash point of at least 130° C., preferably at least 135° C., such as at least 140° C., as measured by ASTM D93.

The hydrocarbon fluid of at least some embodiments has a kinematic viscosity at 100° C. of at most 4 mm$^2$/s, in particular from 1 to 4 mm$^2$/s or from 1 to 3 mm$^2$/s, for instance from 1.5 to less than 4 mm$^2$/s or to less than 3 mm$^2$/s or from 2 to less than 3 mm$^2$/s or from 1 to less than 2 mm$^2$/s or from 3 to less than 4 mm$^2$/s, in particular from 1.5 to 2.5 mm$^2$/s or from more than 2.5 to 3.5 mm$^2$/s, and/or a kinematic viscosity at 40° C. of at most 15 mm$^2$/s, particularly from 4 to 15 mm$^2$/s, or from 4 to 12 mm$^2$/s, such as from 5 to less than 15 mm$^2$/s or from 5 to less than 11 mm$^2$/s or from 6 to 10 mm$^2$/s or from 11 to less than 15 mm$^2$/s, in particular from 4 to 9 mm$^2$/s or from more than 9 to 14 mm$^2$/s. The kinematic viscosities at 100° C. and 40° C. are as measured by ASTM D7042.

For hydrocarbon fluids having a kinematic viscosity at 100° C. of at least 2 mm$^2$/s, as measured by ASTM D7042, the hydrocarbon fluid of at least some embodiments have a viscosity index (VI) of at least 80, such as from 85 to 110, as calculated based on ASTM D2270.

The specific gravity at 15.6° C. of the hydrocarbon fluid of at least some embodiments is at most 0.91, especially from 0.82 to 0.86, such as from 0.83 to 0.85, as measured by ASTM D4052.

The hydrocarbon fluid of at least some embodiments has an aniline point of at least at least 80° C., preferably of at least 85° C., such as from 85 to 110° C., preferably from 85 to less than 99° C., as measured by ASTM D611.

The hydrocarbon fluid of the first aspect of the present invention is most often essentially free of sulfur, i.e. the sulfur content of the hydrocarbon fluid is most often less than 10 wppm, preferably less than 5 wppm and most frequently less than 1 wppm, as determined by ASTM D5453. The hydrocarbon fluid of the first aspect of the present invention is also most often essentially free of nitrogen; i.e. the nitrogen content of the hydrocarbon fluid is most often less than 10 wppm, preferably less than 5 wppm and most frequently less than 1 wppm, as determined by ASTM D4629.

The hydrocarbon fluid of at least some embodiments may be obtainable by a process comprising at least one of hydrodemetallization, hydrotreating, hydrocracking, hydrodewaxing, hydrofinishing, and fractionation of a feedstock. In an especially preferred embodiment, the hydrocarbon fluid is obtainable by a process comprising solvent extraction, hydrodemetallization, hydrotreating, hydrodewaxing, hydrofinishing, and fractionation, especially vacuum fractionation, of a feedstock. An especially suitable feedstock is a vacuum gas oil feedstock. In an even more preferred embodiment, the hydrocarbon fluid is recovered as a sidestream from the fractionation step of a process that produces Group II base oils such as those disclosed in U.S. Pat. Nos. 5,911,874, 6,096,189, 6,951,605, and 9,587,184, all of which are incorporated herewith by reference. In another preferred embodiment, the hydrocarbon fluid may be obtainable from feeds such as vacuum resid or other 510° C.+ feeds, e.g. a feedstock having a T5 boiling point of at least 370° C., by a process comprising solvent deasphalting to produce a deasphalted oil which is fed, possibly with another feed such as vacuum gas oil, to lubes processing, such as a process comprising at least one of solvent extraction, hydrodemetallization, hydrotreating, hydrocracking, hydrodewaxing, hydrofinishing, and fractionation, for instance a process comprising solvent extraction, hydrodemetallization, hydrotreating, hydrodewaxing, hydrofinishing, and fractionation. Examples of such processes are disclosed in US 2017/0183576, US 2017/0183577, and US 2017/0183578, all of which are incorporated herewith by reference. In still another preferred embodiment, the hydrocarbon fluid may be obtainable from feeds such as heavy gas oil, vacuum gas oil, heavy vacuum gas oil, light vacuum gas oil, heavy coker gas oil, and/or hydrotreated heavy coker gas oil, by a process comprising at least hydrotreating, hydrocracking, hydrodewaxing, and fractionation. Examples of such processes are disclosed in U.S. Pat. Nos. 8,394,255, 8,617,383, 8,992,764, 9,309,472, and 9,394,494, all of which are incorporated herewith by reference.

In a second aspect, the present invention relates to the use of the hydrocarbon fluids of the first aspect of the invention various applications including AgChem applications such as spray oils (e.g. as-is as a spray oil or in a spray oil formulation); coolant (e.g. battery coolants, coolants for data storage, process coolant fluids) and/or heat transfer fluids; electric vehicle fluids (e.g. coolant or heat transfer fluid for batteries, motors and/or electrical components); acrylic and silicone mastics and sealants (e.g. silicone oil extenders); printing inks (e.g. printing ink distillates for off-set printing, piezo ink jet technology, cold-set printing, and heat-set printing), paints, coatings, and adhesives; lubricants such as automotive lubricant, transmission fluid, hydraulic oil, spindle oil, coning oil, mould oil and diluent oil for lube additives; plasticizers; drilling fluids and drilling muds (e.g. high viscosity low pour point base oils for drilling muds); mining extraction and metal extraction applications; explosive formulations (e.g. emulsions and ammonium nitrate/fuel oil); process fluids; dust control fluids; metalworking fluids; collector fluids in floatation process (e.g. mining floatation); industrial and institutional cleaners; consumer products; and animal vaccines.

The hydrocarbon fluid of the first aspect of the present invention is especially suitable in AgChem applications, for example as-is (i.e. as a neat product) as a spray oil or in a spray oil formulation. Spray oils (aka horticultural mineral oils (HMOs) or petroleum-derived spray oils (PDSOs)) may be used either as-is or combined with active ingredients such as pesticide to control pests (insects, disease, weeds) in crops. In a third aspect, the present invention therefore relates to spray oils comprising the hydrocarbon fluid of the first aspect of the present invention, optionally in combination with ingredients typically used in spray oils.

It is believed that the specific naphthenic and isoparaffinic contents of the hydrocarbon fluid of the present invention, in combination with its low n-paraffinic content, result among others in a low pour point and a high solvency as compared to hydrocarbon fluids having a different composition, in particular a higher n-paraffinic content. The low aromatics content of the hydrocarbon fluid of the present invention is also advantageous in spray oil applications as it results in a high Unsulfonated Residue (USR) value. Also, unsaturated compounds have been shown to cause acute leaf injury, which injury potentially increasing with an increasing aromatics content.

In an especially preferred embodiment of the third aspect of the present invention, the hydrocarbon fluid has a carbon number distribution of $C_{16}$ to $C_{26}$, preferably $C_{18}$ to $C_{26}$, such as $C_{18}$ to $C_{25}$ or $C_{20}$ to $C_{25}$, as determined by GC-FID. Without being bound by any theory, it is believed that such carbon number distributions are optimal for plant protection, hydrocarbon fluids having a carbon number distribution of less than $C_{20}$ being non-pesticidal and hydrocarbon fluids having a carbon number distribution of $C_{12}$ or less and/or of $C_{26}$ or more having a potentially increased phytotoxicity risk.

The hydrocarbon fluid of the first aspect of the present invention is also especially suitable as-is (i.e. as a neat product) as a coolant and/or heat transfer fluid or in a coolant and/or heat transfer formulation. Such coolant and/or heat transfer fluids include, among others, battery coolants, coolants for data storage, process coolant fluids, heat transfer fluids, and electric vehicle fluids such as coolant or heat transfer fluid for batteries, motors and/or electrical components. In a fourth aspect, the present invention therefore relates to coolants and heat transfer fluids comprising the hydrocarbon fluid of the first aspect of the present invention, optionally in combination with ingredients typically used in coolants and heat transfer fluids.

In particular, the hydrocarbon fluid of the present invention shows advantageous properties in terms of thermal conductivity, specific heat and volume resistivity, in combination with low pour point, low aromatics content, and high flash point.

The hydrocarbon fluid of the first aspect of the present invention is also especially suitable in acrylic and silicone mastics and sealants, for instance as silicone oil extender. Acrylic and silicone mastics and sealants are used as elastic jointing material to exclude dust, dirt and moisture, to contain liquid and gases, to insulate and fill space, and to reduce noise and vibration. In a fifth aspect, the present invention therefore relates to acrylic and silicone mastics and sealants comprising the hydrocarbon fluid of the first aspect of the present invention. (e.g. printing ink distillates for off-set printing, piezo ink jet technology, cold-set printing, and heat-set printing), paints, coatings, and adhesives;

In particular, the hydrocarbon fluid of the present invention shows advantageous properties in acrylic and silicone mastic and sealant applications in terms of low pour point which is needed for outdoor applications in cold weather; low aromatics which results in an improved odor and improved safety but also ensures good color stability (no yellowing with UV exposure); increased compatibility and solvency which enables the use of a higher percentage of hydrocarbon as extender oil in the acrylic and silicone mastics and sealants; and decreased shrinkage thanks to a high flash point.

The hydrocarbon fluid of the first aspect of the present invention is also especially suitable in the formulation of adhesives, paint, coatings and printing inks, such as printing ink distillates for off-set printing, piezo ink jet technology, cold-set printing, and heat-set printing. In a sixth aspect, the present invention therefore relates to an adhesive, paint, coating and/or printing ink, such as an ink for off-set printing, piezo ink jet printing, cold-set printing or heat-set printing, comprising the hydrocarbon fluid of the first aspect of the present invention.

The hydrocarbon fluid of the present invention shows advantageous properties in adhesive, paint, coating and printing ink applications in terms of low pour point, high compatibility or solvency, and low aromatics content which results in an improved UV and long term stability, a lower odor and a lower toxicity for man and the environment.

The hydrocarbon fluid of the first aspect of the present invention is also especially suitable as drilling fluid or as base oil for the formulation of drilling muds. In a seventh aspect, the present invention therefore relates to a drilling fluid or drilling mud comprising the hydrocarbon fluid of the first aspect of the present invention.

The hydrocarbon fluid of the present invention shows advantageous properties in drilling applications in terms of low pour point, high compatibility or solvency, and low aromatics content. Indeed, in drilling fluids, the specifications are often less than 0.5 wt % total aromatics and less than 10 wppm polycyclic aromatic hydrocarbon (PAH) content.

The hydrocarbon fluid of the first aspect of the present invention is also especially suitable as a lubricating base oil to be used in applications such as automotive lubricant, transmission fluid, hydraulic oil, spindle oil, coning oil, mould oil and diluent oil for lube additives. In an eight aspect, the present invention therefore relates to a lubricant comprising the hydrocarbon fluid of the first aspect of the present invention.

Should the disclosure of any patents, patent applications, and publications which are incorporated herein by reference conflict with the description of the present application to the extent that it might render a term unclear, the present description shall take precedence.

EXAMPLES

Particular reference will now be made to the following non-limiting examples.

Example 1—Hydrocarbon Fluids A to I

Hydrocarbon fluids A to I are hydrocarbon fluids consisting essentially of naphthenes and isoparaffins. These hydrocarbon fluids were prepared by a process comprising solvent extracting a vacuum gas oil feedstock followed by hydrodemetallization, hydrotreating, hydrodewaxing, hydrofinishing, and vacuum fractionation. In particular, these hydrocarbon fluids correspond to a sidestream recovered from a process that produces Group II base oils.

The compositions and typical properties of hydrocarbon fluids A to I are summarized in Table 1 below.

TABLE 1

| | Test Method | A | B | C | D | E | F | G | H | I | J | K |
|---|---|---|---|---|---|---|---|---|---|---|---|---|
| COMPOSITION | | | | | | | | | | | | |
| Total paraffins (wt %) | GC-MS | 37 | 31 | 35 | 37 | 34 | 42 | 43 | 49 | 48 | 40 | 35 |
| Total naphthenes (wt %) | GC-MS | 63 | 69 | 65 | 63 | 66 | 58 | 57 | 51 | 52 | 60 | 65 |
| Weight ratio naphthenes to paraffins | GC-MS | 1.7 | 2.1 | 1.9 | 1.7 | 1.9 | 1.4 | 1.3 | 1.0 | 1.1 | 1.5 | 1.9 |
| n-paraffins (wt %) | GC-FID | nd | nd | nd | nd | nd | nd | nd | nd | nd | nd | nd |
| Total saturates (wt %) | ASTM D7419-13 | >99.8 | >99.8 | >99.8 | >99.8 | >99.8 | >99.8 | >99.8 | 99.7 | 99.6 | 99.7 | >99.8 |
| Total aromatics | ASTM D7419-13 | <0.2 | <0.2 | <0.2 | <0.2 | <0.2 | <0.2 | <0.2 | 0.3 | 0.4 | 0.3 | <0.2 |
| % $C_N$ | ASTM D2140-03 | 35 | 38 | 38.5 | 37 | 35 | 32 | 29 | 27 | 26.2 | 37 | 35.8 |
| % $C_P$ | ASTM D2140-03 | 65 | 62 | 62 | 63 | 65 | 68 | 71 | 73 | 73.2 | 63 | 64.1 |
| % $C_A$ | ASTM D2140-03 | 0.1 | 0 | 0 | 0.2 | 0.2 | 0.3 | 0.4 | 0.3 | 0.6 | 0 | 0.1 |
| Carbon number distrib. | GC-FID | C14-C25 | C14-C24 | C13-C20 | C14-C23 | C16-C23 | C18-C25 | C20-C26 | C22-C26 | C22-C26 | C13-C28 | C14-C24 |
| PROPERTIES | | | | | | | | | | | | |
| KV @ 100° C. (mm²/s) | ASTM D7042 | 2.3 | 2.2 | 1.5 | 1.9 | 2.2 | 2.6 | 2.9 | 3.1 | 3.2 | 2.3 | 2.1 |
| KV @ 40° C. (mm²/s) | ASTM D7042 | 8.2 | 7.6 | 4.4 | 5.9 | 7.3 | 9.9 | 11.8 | 13.5 | 13.2 | 8.2 | 6.9 |
| KV @ 25° C. (mm²/s) | ASTM 7042 | 13.4 | 12.4 | 6.5 | 9.2 | 11.9 | 16.8 | 19.2 | 23.5 | 23.1 | 13.3 | 11.1 |
| VI | ASTM D2270 | 88 | 90 | na | na | 106 | 90 | 91 | 81 | 107 | 88 | 100 |
| Flash point (° C.) | ASTM D93 | 144 | 150 | 132 | 144 | 161 | 182 | 185 | 190 | 195 | 137 | 140 |
| Pour point (° C.) | ASTM D5950 | −51 | −54 | −51 | −60 | −54 | −45 | −36 | −39 | −39 | −33 | −48 |
| Distillation (° C.) IBP | ASTM D86 | 289 | 294 | 277 | 286 | 312 | — | 334 | 339 | 335 | — | 288 |
| FBP | | 362 | 343 | 305 | 342 | 339 | — | 370 | 370 | 373 | — | 358 |
| FBP-IBP | | 73 | 48 | 28 | 56 | 27 | — | 36 | 31 | 38 | — | 70 |
| T90-T10 | | 41 | 24 | 14 | 34 | 14 | — | 11 | 9 | 9 | — | 42 |
| Distillation (° C.) IBP | ASTM D2887 | 222 | 230 | 233 | 239 | 275 | 301 | 330 | 354 | 363 | 225 | 246 |
| $T_{50}$ | | 348 | 342 | 300 | 320 | 334 | 362 | 377 | 386 | 388 | 350 | 336 |
| FBP | | 396 | 372 | 329 | 379 | 366 | 395 | 403 | 409 | 410 | 427 | 394 |
| FBP-IBP | | 175 | 142 | 96 | 140 | 91 | 94 | 73 | 52 | 47 | 201 | 148 |
| T90-T10 | | 83 | 58 | 45 | 75 | 48 | 51 | 36 | 24 | 22 | 116 | 87 |
| Specific gravity @ 15.6° C. (g/mL) | ASTM D4052 | 0.839 | 0.846 | 0.834 | 0.838 | 0.839 | 0.839 | 0.837 | 0.835 | 0.835 | 0.846 | 0.839 |
| Aniline point (° C.) | ASTM D611 | 98 | 91 | 87 | 92 | 94 | — | 93 | 107 | 107 | 92 | — |
| Refractive index @ 25° C. | ASTM D1218 | 1.459 | 1.461 | 1.458 | 1.458 | 1.459 | 1.459 | 1.459 | 1.458 | 1.458 | 1.462 | 1.459 | nd: none detected
na: not applicable

The hydrocarbon types of the hydrocarbon fluids, in terms of total paraffins and total naphthenes, were determined by GC-MS based on ASTM D2786-91 which covers the hydrocarbon types analysis of gas oil saturates fractions. Sample preparation: 50 µl of the sample as such was added to an auto-sampler vial filled with hexane. GC conditions: instrument Agilent 7890 Series or equivalent; column HP-5MS, 30 m×0.25 mm ID, 0.25 µm film thickness; temperature profile of 50° C. for 2 min. then to 320° C. at 20° C./min. and 2.5 min. at the final temperature; injector temperature of 280° C.; injection mode split 1/100; injection volume 0.5 µL; detector transfer line 280° C.; constant flow 1.0 mL/min. helium. MS conditions: instrument Agilent 5975C Series or equivalent; solvent delay 3.5 min; scan range 65-410 a.m.u; threshold 100; tune file Stune.U; calibration product is perfluorotributylamine. The calculations were done based on ASTM D2786-91 (see paragraph 4.1). The characteristic mass groupings were:

Σ71=71+85+99+113 (alkanes)
Σ69=69+83+97+111+125+139 (1-ring)
Σ109=109+123+137+151+165+179+193 (2-ring)
Σ149=149+163+177+191+205+219+233+247 (3-ring)
Σ189=189+203+217+231+245+259+273+287+301 (4-ring)
Σ229=229+243+257+271+285+299+313+327+341+355 (5-ring)
Σ269=269+283+297+311+325+339+353+367+381+395+409 (6-ring)
Σ91=91+105+117+119+129+131+133+143+145+147+157+159+171 (monoaromatic).

The calculations were done using the PCMASPEC D2786 software by R. M. Teeter which allows the manual selection of the matrix number (one matrix for each average carbon number) and of the type of matrix (normal or branched paraffins) to be used. The abundance of each hydrocarbon type is calculated with both the branched and the normal matrix of the selected carbon number and a weighted average is made taking into account the amount of n-paraffins determined by GC-FID. The results correspond to the amounts of naphthenes and paraffins (as the sum of n-paraffins and isoparaffins) expressed in wt %. The amount of isoparaffins is obtained by subtracting the amount of n-alkanes from the amount of paraffins. In the hydrocarbon fluid of the present disclosure, it is considered that all the paraffins are isoparaffins since no n-paraffin peaks were identified by GC-FID as determined by the method detailed below (detection limit of 3 wt % n-paraffins).

The presence or absence of n-paraffin peaks was determined by GC-FID using a gas chromatograph (HP6890 Series or equivalent). The apparatus was operated in accordance with the manufacturer's instructions with the following operating conditions: temperature profile of 50° C. to 300° C. at 5° C./min. and 20 min. at the final temperature; injector temperature of 250° C.; injection mode split 1/100; injection volume 0.4 µL; detector temperature 320° C.; column fused silica DB-1, 30 m×0.25 mm ID, 1 µm film thickness; constant flow 1.5 mL/min. helium; detector FID; detector gases hydrogen 40 mL/min. and air 400 mL/min. Calibration was made using a normal paraffin calibration standard/reference (e.g. from Sigma-Aldrich) to encompass the carbon number range for the material being tested, the standard/reference material having a minimum purity of 99% n-paraffins and containing at least 5 n-paraffins in the carbon number range of interest at comparable and known concentrations. Calibration and standardization were done by determining the retention times for the normal paraffins in the standard/reference. Using the apparatus and parameters mentioned above, obtain a GC fingerprint of the sample material. Using the normal paraffin retention times established through calibration and standardization as a guide, identify the normal paraffin peaks of the test sample, if any.

Example 2—Spray Oil Application

The properties of Sample A were compared with a mineral spray oil developed for agricultural use, Oppa™, commercialized by Petrobras.

TABLE 2

| | Test Method | A | Oppa reference |
|---|---|---|---|
| % $C_N$ | ASTM D2140-03 | 35 | 27 |
| % $C_P$ | ASTM D2140-03 | 65 | 70 |
| % $C_A$ | ASTM D2140-03 | 0.1 | 3.3 |
| Carbon number distrib. | GC-FID | C14-C25 | C18-C31 |
| KV @ 100° C. (mm²/s) | ASTM D7042 | 2.3 | 3.2 |

TABLE 2-continued

| | Test Method | A | Oppa reference |
|---|---|---|---|
| KV @ 40° C. (mm²/s) | ASTM D7042 | 8.2 | 13.3 |
| VI | ASTM D2270 | 88 | 104 |
| Pour point (° C.) | ASTM D5950 | −51 | −6 |
| Distillation (° C.) | ASTM D2887 | | |
| IBP | | 222 | 281 |
| $T_{50}$ | | 348 | 387 |
| FBP | | 396 | 486 |
| FBP-IBP | | 175 | 105 |
| Specific gravity @ 15.6° C. (g/mL) | ASTM D4052 | 0.839 | 0.845 |
| Refractive index @ 25° C. | ASTM D1218 | 1.459 | 1.464 |
| Acid content (mg KOH/g) | ASTM D974 | <0.02 | — |
| Unsulfonated Residue (USR) (vol %) | ASTM D483 | 100 | 96.8 |

These results show that, despite a quite similar % $C_P$, sample A is advantageous as compared to the Oppa spray oil reference at least in terms of carbon number distribution (no compounds having a carbon number higher than $C_{25}$, believed to have an increased phytotoxicity), lower aromatics content, increased USR, and lower pour point.

Example 3—Coolant and Heat Transfer Fluid Application

The hydrocarbon fluids of the present invention show promising properties in coolant and heat transfer fluid application, as illustrated by Sample A. Table 3 below shows the properties of Sample A as compared with commercial heat transfer fluids.

In particular, the hydrocarbon fluids of the present invention show good thermal conductivity, specific heat and volume resistivity in combination with an initial boiling temperature higher than 200° C. (vs. Novec™ 7600 Engineered Fluid and Fluorinert® Electronic Liquid FC-43 which have an initial boiling temperature significantly lower than 200° C.) and a specific gravity higher than 0.83 g/mL (vs. Opticool-A Fluid™ and PAO2 which have a specific gravity of 0.80 g/mL).

TABLE 3

| | Test Method | A | MEG ref. | PAO2 ref. | Opticool-A ref. | Novec 7600 ref. | FC-43 ref. |
|---|---|---|---|---|---|---|---|
| IBP (° C.) | ASTM D86 | 289 | 197 | >200 | >200 | 131 | 174 |
| KV @ 100° C. (mm²/s) | ASTM D7042 | 2.3 | — | — | 2.0* | 0.4 | — |
| KV @ 40° C. (mm²/s) | ASTM D7042 | 8.2 | — | 5.0 | 6.4* | 0.8 | — |
| KV @ 25° C. (mm²/s) | ASTM D7042 | 13.4 | 16.9 | — | — | 1.1 | 2.5 |
| Flash point (° C.) | ASTM D93 | 144 | 116 | 160 | 147** | NF | NF |
| Pour point (° C.) | ASTM D5950 | −51 | <−59 | −63 | −57† | −98 | −50 |
| Specific gravity @ 15.6° C. (g/mL) | ASTM D4052 | 0.839 | 1.1 | 0.80 | 0.799‡ | 1.51 | 1.88 |
| Liquid thermal conductivity @ 25° C. (W/m.° C.) | ASTM D2717 | — | 0.26 | — | — | 0.070 | 0.065 |
| Liquid thermal cond. @ 40° C. (W/m.° C.) | ASTM D2717 | — | — | — | 0.14 | 0.066 | 0.064 |
| Liquid thermal cond. @ 80° C. (W/m.° C.) | ASTM D2717 | 0.125 | — | 0.14 | — | 0.054 | 0.061 |
| Specific heat (kJ/Kg.° C.) | ASTM D2766 | 1.9 (@25° C.) | 2.4 (@25° C.) | 2.2 (@25° C.) | 2.2 (@40° C.) | 1.3 (@25° C.) | 1.1 (@25° C.) |
| Volume resistivity (ohm · cm) | ASTM D1169 | $1.3 \times 10^{15}$ (@25° C.) | $9.3 \times 10^5$ (@20° C.) | $2.3 \times 10^{15}$ (@25° C.) | $2.3 \times 10^{15}$ (@25° C.) | $3 \times 10^{10}$ (@25° C.) | $3.4 \times 10^{15}$ (@25° C.) |

NF: non-flammable
*Measured by ASTM D88.
**Measured by ASTM D92.
†Measured by ASTM D97.
‡Measured by ASTM D1298 at 20° C.

MEG is monoethylene glycol. PAO2 is a polyalphaolefin fluid having a kinematic viscosity at 100° C. of about 2 mm²/s, commercialized by ExxonMobil. Opticool-A Fluid™ is a synthetic dielectric heat transfer and insulating fluid made from highly purified synthetic hydrocarbon oils and advanced antioxidants, commercialized by DSI Ventures. Novec™ 7600 Engineered Fluid is a heat transfer fluid commercialized by 3M™. FC-43 reference is Fluorinert® Electronic Liquid FC-43, a fully-fluorinated heat transfer liquid commercialized by 3M.

Example 4—Acrylic and Silicone Mastic and Sealant Applications

The properties of Samples A and D were compared with Hydroseal™ G400H, a plasticizer for silicone sealant commercial available from Total in Table 4 below.

TABLE 4

| | Test Method | A | D | Hydroseal G400H reference |
|---|---|---|---|---|
| COMPOSITION | | | | |
| Total paraffins (wt %) | GC-MS | 37 | 37 | 61 |
| Total naphthenes (wt %) | GC-MS | 63 | 63 | 39 |
| % $C_A$ | ASTM D2140-03 | 0.1 | 0.2 | 0.8 |
| PROPERTIES | | | | |
| KV @ 25° C. (mm²/s) | ASTM D7042 | 13.4 | 9.2 | 9.0 |
| Flash point (° C.) | ASTM D93 | 144 | 144 | 158 |
| Pour point (° C.) | ASTM D5950 | −51 | −60 | −4 |
| IBP | ASTM D86 | 289 | 286 | 305 |
| FBP | ASTM D86 | 362 | 342 | 349 |
| Aniline point (° C.) | ASTM D611 | 98 | 92 | 101 |

These results show that the hydrocarbon fluids of the present invention are advantageous as compared to Hydroseal G400H in terms of lower pour point (better cold temperature performance), lower aromatics content (less odor, less yellowing) and lower aniline point (increased compatibility/solvency, i.e. higher percentage of hydrocarbon as acrylic or silicone extender).

Example 5—Printing Ink Applications

The hydrocarbon fluids of the present invention show promising properties in printing ink application, as illustrated by Samples A and D. Table 5 below shows the properties of Samples A and D as compared with commercial hydrocarbon solvents suitable for printing inks.

TABLE 5

| | Test Method | A | D | Scriptane PW 28/32 H | Scriptane PW 30/35 H | Magiesol 60 |
|---|---|---|---|---|---|---|
| Aromatics (wt %) | ASTM D7419-13 | <0.2 | <0.2 | 50 ppm* | 50 ppm* | 1.4 wt %* |
| IBP (° C.) | ASTM D86 | 289 | 286 | 278 | 304 | 317 |
| FBP (° C.) | ASTM D86 | 362 | 342 | 322 | 349 | 344 |
| KV @ 40° C. (mm²/s) | ASTM D7042 | 8.2 | 5.9 | 4.1 | 6.0 | 9.6 |
| Flash point (° C.) | ASTM D93 | 144 | 144 | 135 | 158 | 152 |
| Pour point (° C.) | ASTM D5950 | −51 | −60 | −17 | 0 | 10** |
| Aniline point (° C.) | ASTM D611 | 98 | 92 | 93 | 101 | 96 |

*As measured by UV.
**As measured by ASTM D97.

Scriptane® PW 28/32 H and Scriptane PW 30/35 H special fluids are low aromatic printing ink distillates commercially available from Total. Magiesol® 60 specialty solvent is a low aromatic, aliphatic solvent for the printing ink industry, commercialized by Calumet.

As compared to these commercial products, the hydrocarbon fluids of the present invention show an improved pour point in combination with an excellent solvency (expressed in terms of aniline point).

Additionally or alternatively, embodiments disclosed herein relate to:

Embodiment 1

A hydrocarbon fluid having a pour point of at most −30° C., as measured by ASTM D5950, and comprising at least 99 wt % of naphthenes and paraffins, based on the total weight of the hydrocarbon fluid, wherein the weight ratio of naphthenes to paraffins is at least 1, as measured by GC-MS, and wherein the paraffins consist essentially of isoparaffins, as determined by GC-FID.

Embodiment 2

The hydrocarbon fluid of embodiment 1, wherein the weight ratio of naphthenes to paraffins is from greater than 1.0 to 4.0, preferably from greater than 1.0 to 3.0, more preferably from greater than 1.0 to 2.3, in particular from greater than 1.0 to 1.5 or from 1.2 to 2.3, such as from 1.5 to 2.3.

Embodiment 3

The hydrocarbon fluid of embodiment 1 or 2, comprising from 50 to 90 wt % naphthenes, preferably from 50 to 80 wt %, more preferably from more than 50 wt % to 70 wt %, most preferably from more than 50 wt % to 60 wt % or from 60 to 70 wt % naphthenes, and from 10 to 50 wt % paraffins, preferably from 20 to 50 wt %, more preferably from 30 to 50 wt %, most preferably from more than 40 to 50 wt % or from 30 to 45 wt % paraffins, based on the total weight of the hydrocarbon fluid, as measured by GC-MS, and no more than 1 wt % total aromatics, based on the total weight of the hydrocarbon fluid, as measured by ASTM D7419.

Embodiment 4

The hydrocarbon fluid of anyone of embodiments 1 to 3, comprising less than 1 wt % total aromatics, preferably no more than 0.6 wt %, more preferably no more than 0.3 wt % total aromatics, as measured by ASTM D7419.

Embodiment 5

The hydrocarbon fluid of anyone of embodiments 1 to 4, comprising a % $C_N$ of from 20 to 50%, a % $C_P$ of from 50 to 80%, and a % $C_A$ of less than 1%, preferably a % $C_N$ of from 25 to 40%, a % $C_P$ of from 60 to 75%, and a % $C_A$ of no more than 0.5%, more preferably a % $C_N$ of from 30 to 40%, a % $C_P$ of from 60 to 70%, and a % $C_A$ of no more than 0.4 or 0.3%, based on the total weight of the hydrocarbon fluid and as measured by ASTM D2140.

Embodiment 6

The hydrocarbon fluid of anyone of embodiments 1 to 5, having a refractive index (RI) of from 1.450 to 1.470, particularly of from 1.455 to 1.465, more particularly of from 1.457 to 1.463, as determined by ASTM D1218 at 25° C. stop

Embodiment 7

The hydrocarbon fluid of any ones of embodiments 1 to 6, having an initial boiling point (IBP) of at least 250° C., in particular at least 270° C., more particularly at least 280° C. and a final boiling point (FBP) of at most 410° C., in particular at most 390° C., more particularly at most 380° C., and preferably having a distillation range as defined by (FBP-IBP) of at most 100° C., especially of at least 20 and at most 90° C., and/or a distillation range as defined by ($T_{90}$-$T_{10}$) of at most 60° C., especially of at least 5 and at most 50° C., as measured by ASTM D86; and/or having an initial boiling point (IBP) or at least 190° C., in particular at least 200, more particularly at least 210° C. and a final boiling point (FBP) of at most 450° C., in particular at most 440° C., more particularly at most 430° C., and preferably having a distillate range as defined by (FBP-IBP) of at most 250° C., especially of at least 40° C. and at most 220° C., and/or a distillation range as defined by ($T_{90}$-$T_{10}$) of at most 150° C., especially of at least 20 and at most 100° C., as measured by ASTM D2887.

Embodiment 8

The hydrocarbon fluid of any ones of embodiments 1 to 7, having at least one of the following properties:
(i) a flash point of at least 130° C., preferably at least 135° C., more preferably at least 140° C., as measured by ASTM D93;
(ii) a pour point of at most −35° C., preferably at most −40° C., more preferably at most −50° C., as measured by ASTM D5950;
(iii) a kinematic viscosity at 100° C. of from 1 to 4 mm$^2$/s, preferably from 1.5 to less than 4 mm$^2$/s, more preferably from 1.5 to 2.5 mm$^2$/s or from more than 2.5 to 3.5 mm$^2$/s, especially from to, as measured by ASTM D7042;
(iv) a kinematic viscosity at 40° C. of from 4 to 15 mm$^2$/s, preferably from 5 to less than 15 mm$^2$/s, more preferably from 4 to 9 mm$^2$/s or from more than 9 to 14 mm$^2$/s, as measured by ASTM D7042;
(v) for the hydrocarbon fluids having a kinematic viscosity at 100° C. of at least 2 mm$^2$/s, as measured by ASTM D7042, a viscosity index (VI) of at least 80, preferably from 85 to 110, as calculated based on ASTM D2270;
(vi) a specific gravity at 15.6° C. of at most 0.91, preferably of 0.82 to 0.86, more preferably from 0.83 to 0.85, as measured by ASTM D4052; and
(vii) an aniline point of at least 80° C., preferably of at last 85° C., more preferably of from 85 to 110° C., as measured by ASTM D611.

Embodiment 9

The hydrocarbon fluid of embodiment 8 meeting at least two requirements of properties (i) to (vii), preferably at least three, more preferably at least four, most preferably all the requirements of properties (i) to (vii).

Embodiment 10

The hydrocarbon fluid of any one of embodiments 1 to 9, wherein the hydrocarbon fluid is derived by one or more processes selected from the group consisting of hydrodemetallization, hydrotreating, hydrodewaxing, hydrofinishing, and fractionation of a feedstock, preferably wherein the feedstock is a vacuum gas oil feedstock.

Embodiment 11

Use of the hydrocarbon fluid of any one of embodiments 1 to 10 in any one of AgChem applications such as spray oils; coolant and/or heat transfer fluids; electric vehicle fluids; acrylic and silicone mastics and sealants; printing inks, paints, coatings, and adhesives; lubricants such as automotive lubricant, transmission fluid, hydraulic oil, spindle oil, coning oil, mould oil and diluent oil for lube additives; plasticizers; drilling fluids and drilling muds; mining extraction and metal extraction applications; explosive formulations; process fluids; dust control fluids; metalworking fluids; collector fluids in floatation process; industrial and institutional cleaners; consumer products; and animal vaccines.

Embodiment 12

Spray oil comprising the hydrocarbon fluid of any one of embodiments 1 to 10.

Embodiment 13

Coolant, heat transfer fluid or electric vehicle fluid comprising the hydrocarbon fluid of any one of embodiments 1 to 10.

Embodiment 14

Acrylic or silicone mastic or sealant comprising the hydrocarbon fluid of any one of embodiments 1 to 10.

Embodiment 15

Printing ink, paint, coating or adhesive comprising the hydrocarbon fluid of any one of embodiments 1 to 10.

Embodiment 16

Drilling fluid or drilling mud comprising the hydrocarbon fluid of any one of embodiments 1 to 10.

Embodiment 17

Lubricant comprising the hydrocarbon fluid of any one of embodiments 1 to 10.

The invention claimed is:

1. A hydrocarbon fluid having a pour point of at most −30° C., as measured by ASTM D5950, and comprising at least 99 wt % of naphthenes and paraffins, based on the total weight of the hydrocarbon fluid, wherein the weight ratio of naphthenes to paraffins is at least 1, as measured by GC-MS, wherein the paraffins consist essentially of isoparaffins, as determined by GC-FID, and wherein the hydrocarbon fluid comprises a naphthenic carbon content (% $C_N$) from 20 to 50%, a paraffinic carbon content (% $C_P$) from 50 to 80%, and an aromatic carbon content (% $C_A$) less than 1%, based on the total weight of the hydrocarbon fluid and as measured by ASTM D2140.

2. The hydrocarbon fluid of claim 1, wherein the weight ratio of naphthenes to paraffins is from greater than 1.0 to 4.0.

3. The hydrocarbon fluid of claim 1, comprising from 50 to 90 wt % naphthenes and from 10 to 50 wt % paraffins, based on the total weight of the hydrocarbon fluid, as measured by GC-MS, and no more than 1 wt % total aromatics, based on the total weight of the hydrocarbon fluid, as measured by ASTM D7419.

4. The hydrocarbon fluid of claim 1, having a refractive index (RI) of from 1.450 to 1.470, as determined by ASTM D1218 at 25° C.

5. The hydrocarbon fluid of claim 1, having at least one of the following properties:
   an initial boiling point (IBP) of at least 250° C., a final boiling point (FBP) of at most 410° C., a distillation range as defined by (FBP-IBP) of at most 100° C., and a distillation range as defined by (T90-T10) of at most 60° C., as measured by ASTM D86;
   (ii) a flash point of at least 130° C., as measured by ASTM D93;
   (iii) a pour point of at most −35° C., as measured by ASTM D5950;
   (iv) a kinematic viscosity at 100° C. of from 1 to 4 mm2/s, as measured by ASTM D7042;
   (v) a kinematic viscosity at 40° C. of from 4 to 15 mm2/s, as measured by ASTM D7042;
   (vi) for the hydrocarbon fluids having a kinematic viscosity at 100° C. of at least 2 mm2/s, as measured by ASTM D7042, a viscosity index (VI) of at least 80, as calculated based on ASTM D2270;
   (vii) a specific gravity at 15.6° C. of at most 0.91, as measured by ASTM D4052; and
   (viii) an aniline point of at least 80° C., as measured by ASTM D611.

6. The hydrocarbon fluid of claim 1, wherein the hydrocarbon fluid is derived by one or more processes selected from the group consisting of solvent extraction, hydrodemetallization, hydrotreating, hydrodewaxing, hydrofinishing, and fractionation of a feedstock.

7. A hydrocarbon fluid having a pour point of at most −30° C., as measured by ASTM D5950, and comprising at least 99 wt % of naphthenes and isoparaffins, as determined by GC-FID, and no more than 1 wt % total aromatics as measured by ASTM D7419, based on the total weight of the hydrocarbon fluid, wherein the weight ratio of naphthenes to paraffins is 1.2 to 4.0, as measured by GC-MS, wherein the paraffins contain at least 97 wt % isoparaffins, as determined by GC-FID, and wherein the hydrocarbon fluid comprises a naphthenic carbon content (% $C_N$) from 20 to 50%, a paraffinic carbon content (% $C_P$) from 50 to 80%, and an aromatic carbon content (% $C_A$) less than 1%, based on the total weight of the hydrocarbon fluid and as measured by ASTM D2140.

8. The hydrocarbon fluid of claim 1, wherein the hydrocarbon fluid has at least two of the following properties:
   (ix) an initial boiling point (IBP) of at least 250° C., a final boiling point (FBP) of at most 410° C., a distillation range as defined by (FBP-IBP) of at most 100° C., and a distillation range as defined by (T90-T10) of at most 60° C., as measured by ASTM D86;
   (x) a flash point of at least 130° C., as measured by ASTM D93;
   (xi) a pour point of at most −35° C., as measured by ASTM D5950;
   (xii) a kinematic viscosity at 100° C. of from 1 to 4 mm$^2$/s, as measured by ASTM D7042;
   (xiii) a kinematic viscosity at 40° C. of from 4 to 15 mm$^2$/s, as measured by ASTM D7042;
   (xiv) for the hydrocarbon fluids having a kinematic viscosity at 100° C. of at least 2 mm$^2$/s, as measured by ASTM D7042, a viscosity index (VI) of at least 80, as calculated based on ASTM D2270;
   (xv) a specific gravity at 15.6° C. of at most 0.91, as measured by ASTM D4052; and
   (xvi) an aniline point of at least 80° C., as measured by ASTM D611.

9. The hydrocarbon fluid of claim 1, wherein the weight ratio of naphthenes to paraffins is from greater than 1.0 to 4.0, and the hydrocarbon fluid comprises 50 to 90 wt % naphthenes and from 10 to 50 wt % isoparaffins, based on the total weight of the hydrocarbon fluid, as measured by GC-MS, and no more than 1 wt % total aromatics, based on the total weight of the hydrocarbon fluid, as measured by ASTM D7419.

10. The hydrocarbon fluid of claim 1, wherein the weight ratio of naphthenes to paraffins is from greater than 1.0 to 4.0, and the hydrocarbon fluid comprises a % $C_N$ of from 20 to 50%, a % $C_P$ of from 50 to 80%, and a % $C_A$ of less than 1%, based on the total weight of the hydrocarbon fluid and as measured by ASTM D2140.

11. The hydrocarbon fluid of claim 1, wherein the weight ratio of naphthenes to paraffins is from greater than 1.0 to 4.0.

12. A hydrocarbon fluid having a pour point of at most −30° C., as measured by ASTM D5950, and comprising at least 99 wt % of naphthenes and paraffins, based on the total weight of the hydrocarbon fluid, wherein the weight ratio of naphthenes to paraffins is at least 1, as measured by GC-MS, and wherein the paraffins contain at least 97 wt % isoparaffins, as determined by GC-FID, and wherein the hydrocarbon fluid comprises a naphthenic carbon content (% $C_N$) from 20 to 50%, a paraffinic carbon content (% $C_P$) from 50 to 80%, and an aromatic carbon content (% $C_A$) less than 1%, based on the total weight of the hydrocarbon fluid and as measured by ASTM D2140.

13. The hydrocarbon fluid of claim 1, having a refractive index (RI) of from 1.455 to 1.465, as determined by ASTM D1218 at 25° C.

14. The hydrocarbon fluid of claim 1, wherein the % $C_N$ is from 25 to 40%, the % $C_P$ is from 60 to 75%, and the % $C_A$ is 0.5% or less, based on the total weight of the hydrocarbon fluid and as measured by ASTM D2140.

15. The hydrocarbon fluid of claim 1, wherein the hydrocarbon fluid has a kinematic viscosity at 100° C. of at least 2 mm$^2$/s as measured by ASTM D7042, and a viscosity index (VI) of at least 80, as calculated based on ASTM D2270.

* * * * *